(12) United States Patent
Kikuchi (10) Patent No.: US 12,184,804 B2
(45) Date of Patent: Dec. 31, 2024

(54) ELECTRONIC DEVICE

(71) Applicant: SHARP KABUSHIKI KAISHA, Sakai (JP)

(72) Inventor: Natsuki Kikuchi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 315 days.

(21) Appl. No.: 17/701,280

(22) Filed: Mar. 22, 2022

(65) Prior Publication Data

US 2022/0345551 A1     Oct. 27, 2022

(30) Foreign Application Priority Data

Apr. 22, 2021   (JP) .................................. 2021-072311

(51) Int. Cl.
*H04M 1/02* (2006.01)
*H01M 50/247* (2021.01)

(52) U.S. Cl.
CPC ......... *H04M 1/026* (2013.01); *H01M 50/247* (2021.01); *H01M 2220/30* (2013.01)

(58) Field of Classification Search
CPC .. H04M 1/026; H04M 1/0262; H01M 50/247; H01M 2220/30
See application file for complete search history.

(56) References Cited

U.S. PATENT DOCUMENTS

| | | | |
|---|---|---|---|
| 9,624,404 B2 | 4/2017 | Jozuka et al. | |
| 10,070,552 B2 | 9/2018 | Liu et al. | |
| 2009/0229732 A1 | 9/2009 | Determan et al. | |
| 2012/0019696 A1* | 1/2012 | Tai | H01L 27/14621 348/E5.091 |
| 2013/0057510 A1* | 3/2013 | Kern | G06F 3/045 345/174 |
| 2014/0123459 A1 | 5/2014 | Casebolt et al. | |
| 2014/0355207 A1 | 12/2014 | Stephens et al. | |
| 2015/0064386 A1 | 3/2015 | Mag et al. | |
| 2016/0192550 A1 | 6/2016 | Casebolt et al. | |
| 2017/0033335 A1* | 2/2017 | Kojima | H01M 50/211 |
| 2017/0227809 A1 | 8/2017 | Sato et al. | |
| 2018/0083322 A1* | 3/2018 | Pakula | G06F 1/1637 |
| 2018/0159097 A1 | 6/2018 | Fukushima et al. | |
| 2019/0253539 A1 | 8/2019 | Ma et al. | |
| 2020/0145521 A1 | 5/2020 | Masutomi | |
| 2022/0137668 A1 | 5/2022 | Schwager et al. | |
| 2023/0269319 A1 | 8/2023 | Shim et al. | |

FOREIGN PATENT DOCUMENTS

| | | | |
|---|---|---|---|
| JP | 2013-182767 A | | 9/2013 |
| JP | 2015162390 A | * | 9/2015 |

* cited by examiner

*Primary Examiner* — Raymond S Dean
(74) *Attorney, Agent, or Firm* — ScienBiziP, P.C.

(57) ABSTRACT

An electronic devices includes: an electronic component; a cabinet provided facing the electronic component, an adhesive sheet including two extending portions extending along two adjacent sides of the electronic component and a curved portion connecting the two extending portions, and being provided between the electronic component and the cabinet; and a tab provided in one of the two extending portions, and configured to enable the adhesive sheet to be pulled. The adhesive sheet has a notched portion provided on a side of the one of the extending portions closer to the curved portion and one side in a width direction of the adhesive sheet.

3 Claims, 10 Drawing Sheets

ELECTRONIC DEVICE

CROSS-REFERENCE TO RELATED APPLICATION

The present application claims priority from Japanese Application JP2021-072311, the content of which is hereby incorporated by reference into this application.

BACKGROUND OF THE INVENTION

1. Field of the Invention

The present invention relates to an electronic device.

2. Description of the Related Art

For example, JP 2013-182767 A discloses a mobile phone including: a battery holder storing and fixing a battery pack with an adhesive; and a battery detachment sheet provided in the battery holder and having one end drawn from a battery pack installation surface to a rear side of the battery pack installation surface through a slit provided in the battery pack installation surface. In the mobile phone described above, the battery pack is taken out from the battery holder by pulling a portion provided on the other end of the battery detachment sheet and extending from an opening facing the battery pack installation surface of the battery holder in a direction perpendicular to the battery pack installation surface and peeling off the adhesive from the battery pack.

SUMMARY OF THE INVENTION

In the electronic device (mobile phone) as described above, there is concern that when the pull-tab portion is pulled, stress is applied to a portion near the pull-tab portion of the battery pack, which may deform the battery pack and prevent it from being reused.

Thus, for example, there is employed a method in which an electronic component such as a battery pack and a cabinet to which the electronic component is attached are fixed using an adhesive sheet, and a tab provided in the adhesive sheet itself is pulled to peel off the adhesive sheet, thereby detaching the electronic component.

In the above-described method, the adhesive sheet is generally formed into a band shape having a substantially constant width and is disposed to extend along a profile of the electronic component; thus, a case where the adhesive sheet curved along a corner of the electronic component, when the adhesive sheet is pulled using the tab, the adhesive sheet may become entangled in the curved portion. When the adhesive sheet becomes entangled, the adhesive sheet may be cut and left at the curved portion, so that the electronic component may be damaged or may not be detached.

One aspect of the present invention is directed to providing an electronic device in which an electronic component can be easily detached with being damaged, for example.

An electronic device according to one aspect of the present invention includes: an electronic component; a cabinet provided facing the electronic component, an adhesive sheet including two extending portions extending along two adjacent sides of the electronic component and a curved portion connecting the two extending portions, and being provided between the electronic component and the cabinet; and a tab provided in one of the two extending portions, and configured to enable the adhesive sheet to be pulled, wherein the adhesive sheet has a notched portion provided on a side of the one of the two extending portions closer to the curved portion and on one side in a width direction of the adhesive sheet.

DETAILED DESCRIPTION OF THE INVENTION

Embodiments of the present invention will be described below with reference to the drawings. Note that, in the present specification and drawings, same or equivalent elements are denoted by the same reference numerals to omit duplicated description, and elements that are not directly related to the present invention are not illustrated in some cases. Furthermore, forms of the components illustrated in such embodiments are merely exemplary and the present invention is not limited to these forms.

Figure 1:
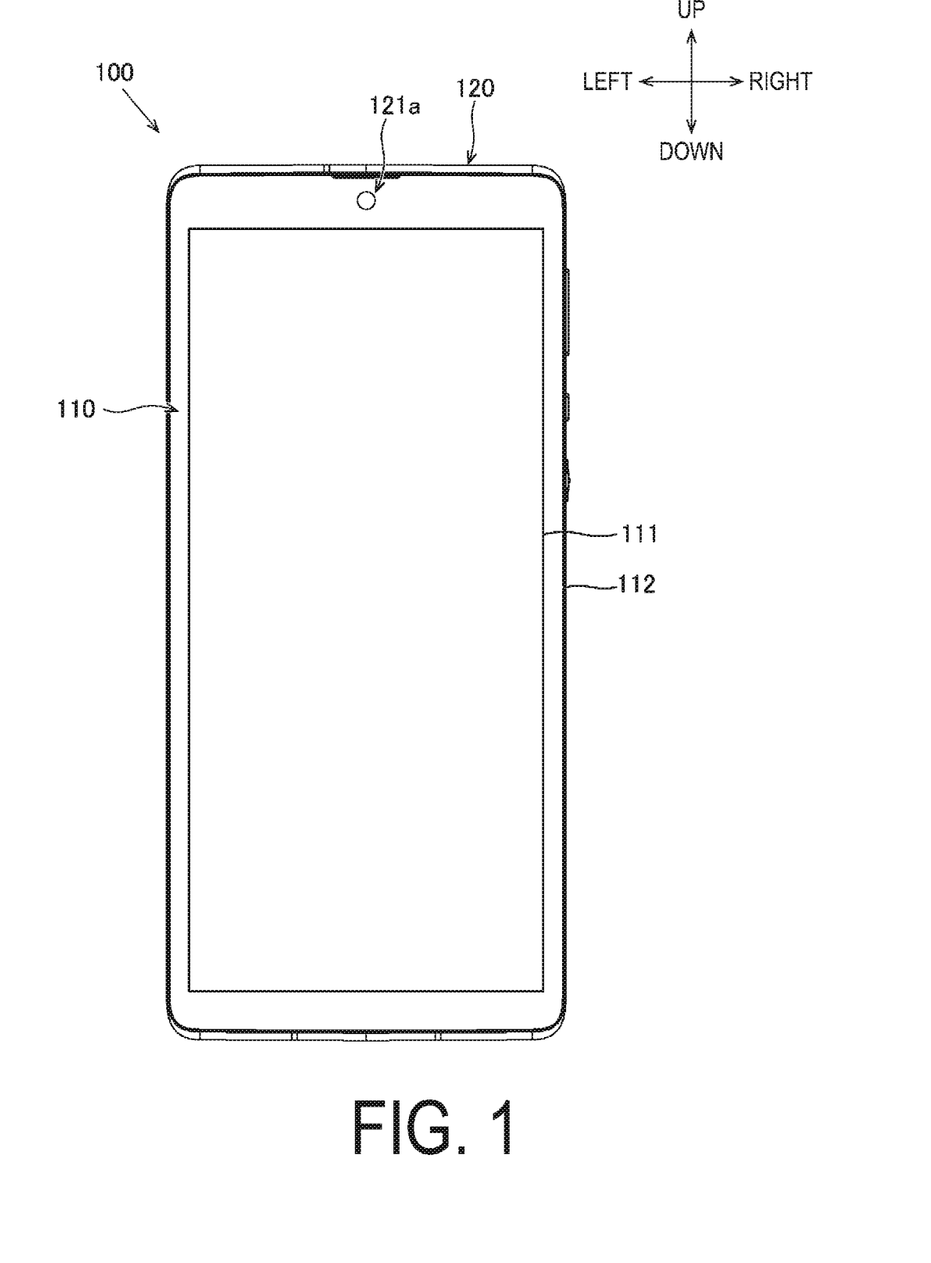
FIG. 1 is a front view of an electronic device.
Figure 2:
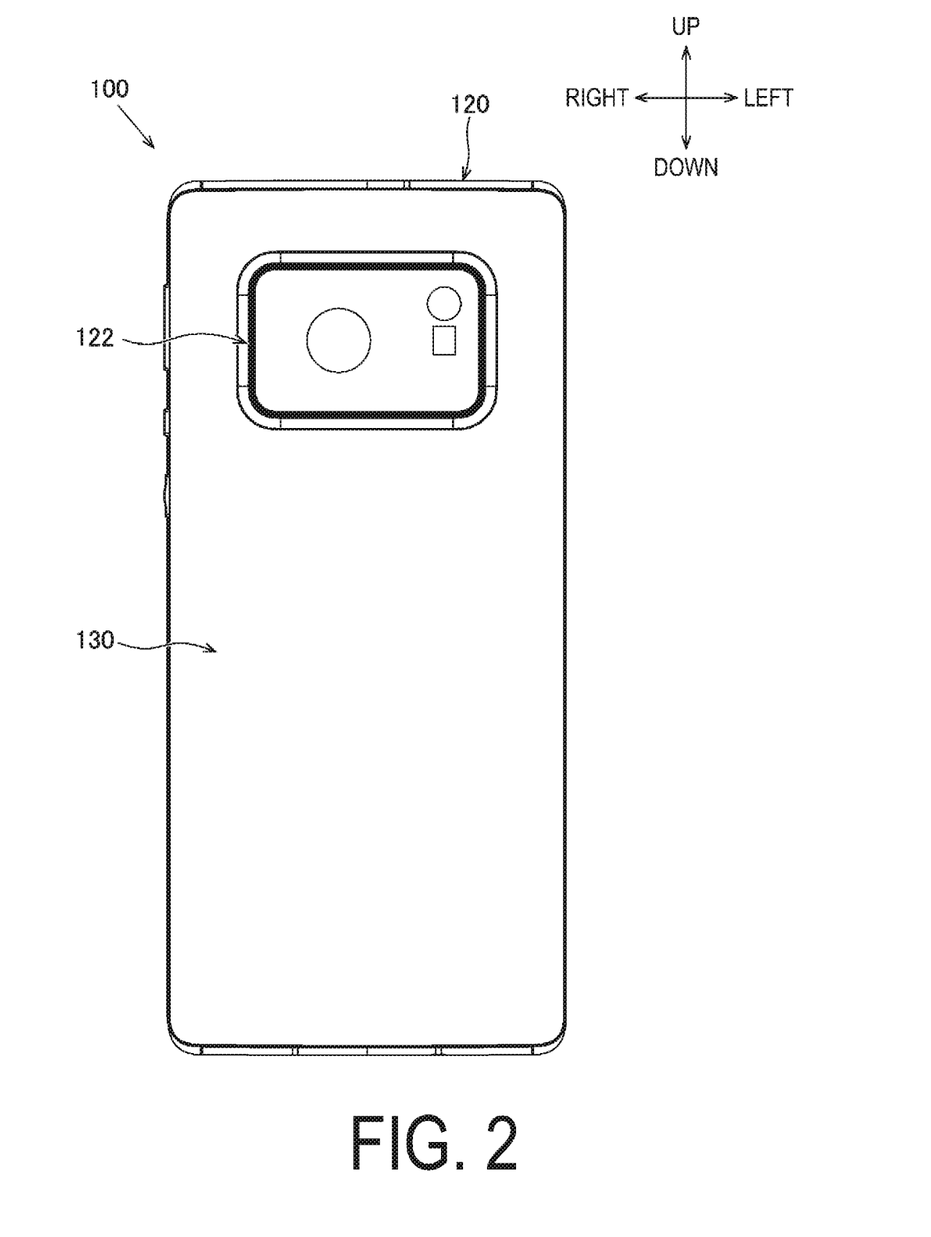
FIG. 2 is a rear view of the electronic device.
Figure 3:
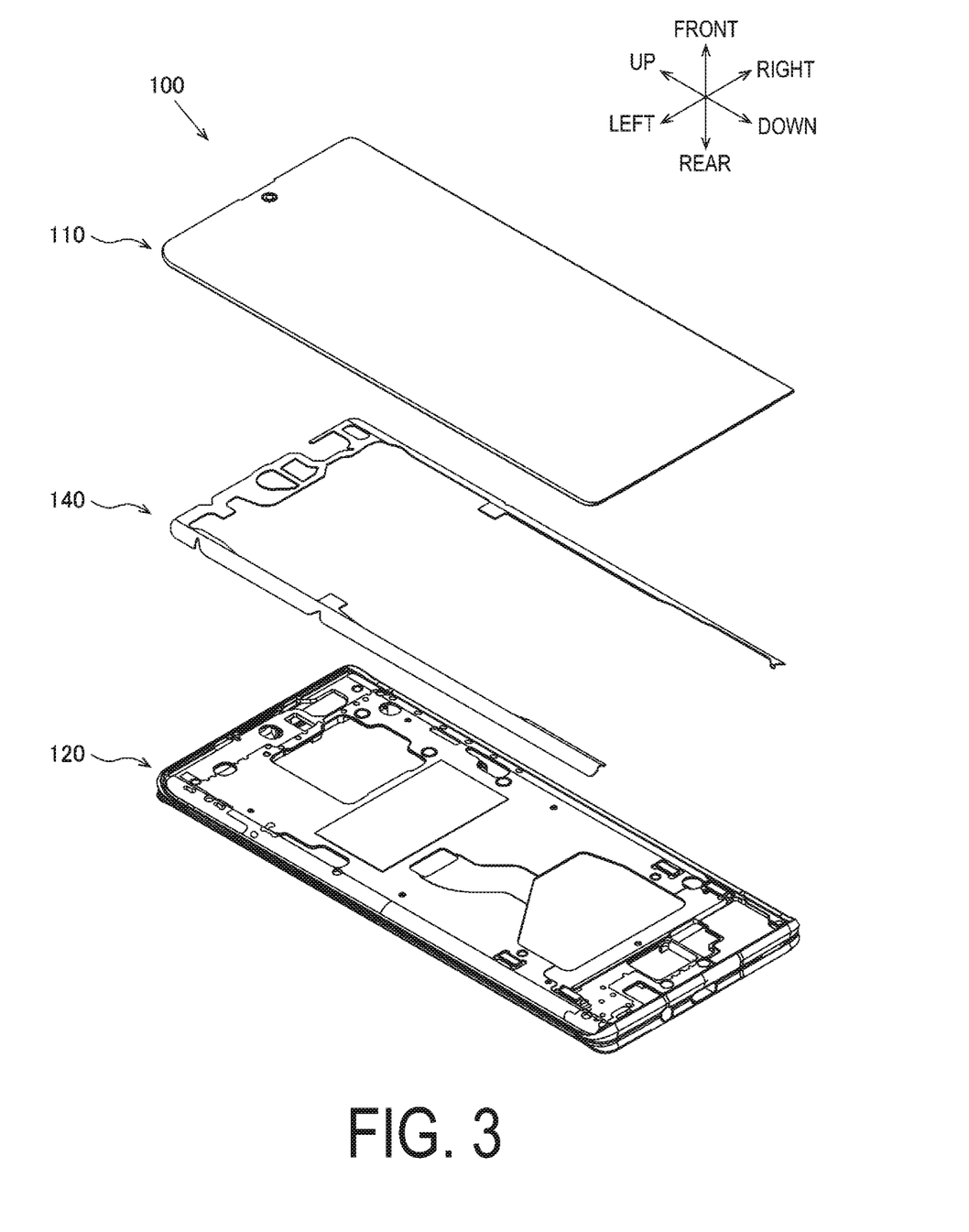
FIG. 3 is an exploded perspective view of the electronic device.

Hereinafter, an electronic device 100 according to one aspect of the present invention will be described with reference to FIGS. 1 to 3. The electronic device 100 is a smartphone, for example. The electronic device 100 only needs to be an electronic device provided with a display unit 110 described below, and is not limited to the smartphone, but may be various electronic devices such as a foldable mobile phone, a wearable terminal, or a tablet terminal. FIG. 1 is a front view of the electronic device 100. FIG. 2 is a rear view of the electronic device 100. FIG. 3 is an exploded perspective view of the electronic device 100. In FIG. 3, a substrate and a rear cover 130 attached to a cabinet 120 are omitted. In the following description, a longitudinal direction of the display unit 110 described below defined as a vertical direction, a lateral direction of the display unit 110 is defined as a left-right direction, and a thickness direction of the display unit 110 is defined as a front-rear direction. In addition, in the electronic device 100, a side on which the display unit 110 is provided is defined as a front side. However, these directions are directions defined for convenience sake of description, and there is no intention to define a direction in use.

The electronic device 100 has a flat profile formed in a substantially rectangular shape in a front view, for example. The electronic device 100 includes the display unit 110, the cabinet 120, and the rear cover 130, for example.

The display unit 110 is formed in a substantially rectangular shape in a front view, for example. The display unit 110 includes a display panel 111 on which an image can be displayed, and a cover panel 112 provided in a superimposed manner on a front surface of the display panel 111. The display panel 111 is, for example, a panel having an organic light emitting diode (OLED) as a self-light-emitting element. The cover panel 112 is a panel covering the front surface of the display panel 111. The cover panel 112 is provided integrally with a touch panel, for example.

Note that the splay panel 111 includes an organic light emitting diode (OLED) as the self-light-emitting element, but this is not a limitation, and the display panel 111 may include a quantum dot light emitting diode (QLED), for example. Alternatively, the display panel 111 is not limited to a panel including a self-light-emitting element, and may be, for example, a liquid crystal panel (LCD). In addition, the cover panel 112 is provided integrally with the touch panel, but this is not a limitation, and the cover panel 112 may include only a glass panel or an acrylic panel.

The cabinet 120 is formed in a substantially rectangular plate shape. Further, a peripheral edge portion of the cabinet 120 protrudes forward and rearward. The cabinet 120 is made of a resin or metal.

The display unit 110 is attached to a front surface of the cabinet 120. The display unit 110 is fitted into and attached to the peripheral edge portion of the cabinet 120 so as to cover substantially the entire front surface of the cabinet 120. Specifically, the display panel 111 is disposed, for example, with a space vertically in the front surface of the cabinet 120. The cover panel 112 is disposed to cover substantially the entire front surface of the cabinet 120.

A substrate (not illustrated) on which various electronic components (e.g., a first camera module 121, a second camera module 122, and a receiver 123, and the like described below) that constitute the electronic device 100 are mounted and a rechargeable battery 124 are attached to the rear surface of the cabinet 120.

Figure 4:
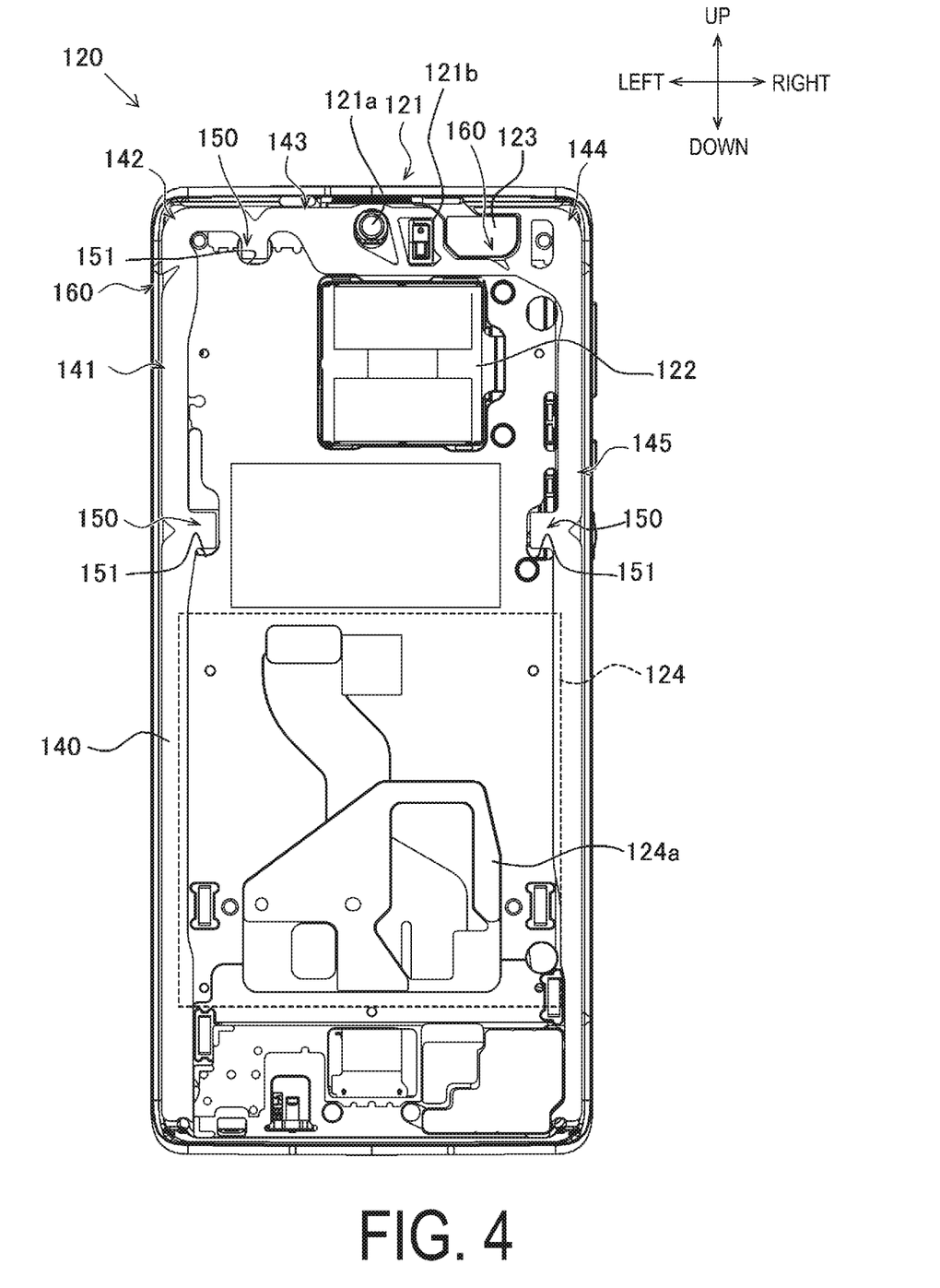
FIG. 4 is a front view of a cabinet with an adhesive sheet attached.

The first camera module 121 is disposed in a center of an upper end portion of the cabinet 120 (see FIG. 4). The first camera module 121 is disposed in such a manner that an imaging direction is forward. The first camera module 121 is an in-camera. The first camera module 121 includes a camera 121a including a color image sensor, a lens, and the like, and a proximity sensor 121b, for example. In the center of the upper end portion of the cabinet 120, the camera 121a is disposed on the left side and the proximity sensor 121b is disposed on the right side. The proximity sensor 121b detects the presence of a nearby object in a predetermined range of the proximity sensor 121b. The electronic device 100 suppresses malfunction of an application using the proximity sensor 121b, for example.

The second camera module 122 is disposed in a center on an upper side of the cabinet 120, more specifically, on a lower side of the first camera module 121 (see FIG. 4). The second camera module 122 is disposed in such a manner that the imaging direction is rearward. The second camera module 122 is an out camera.

The receiver 123 is disposed on a right side of the upper end portion of the cabinet 120 (see FIG. 4). The receiver 123 plays back audio based on an audio signal input from a controller.

The rechargeable battery 124 is disposed from a center to a lower portion of the rear surface of the cabinet 120 (see FIG. 4). The rechargeable battery 124 functions as a power source for the electronic device 100. The rechargeable battery 124 is, for example, a rechargeable battery such as a lithium ion battery. A spacer 124a for the rechargeable battery 124 is disposed in a center on the lower side of the cabinet 120.

The rear cover 130 is formed in a substantially rectangular shape in a front view, for example. The rear cover 130 is attached to the rear surface of the cabinet 120. The rear cover 130 is fitted into and attached to the peripheral edge portion of the cabinet 120 so as to cover substantially the entire rear surface of the cabinet 120. The rear cover 130 has an opening for exposing the second camera module 122 outward.

Figure 5:
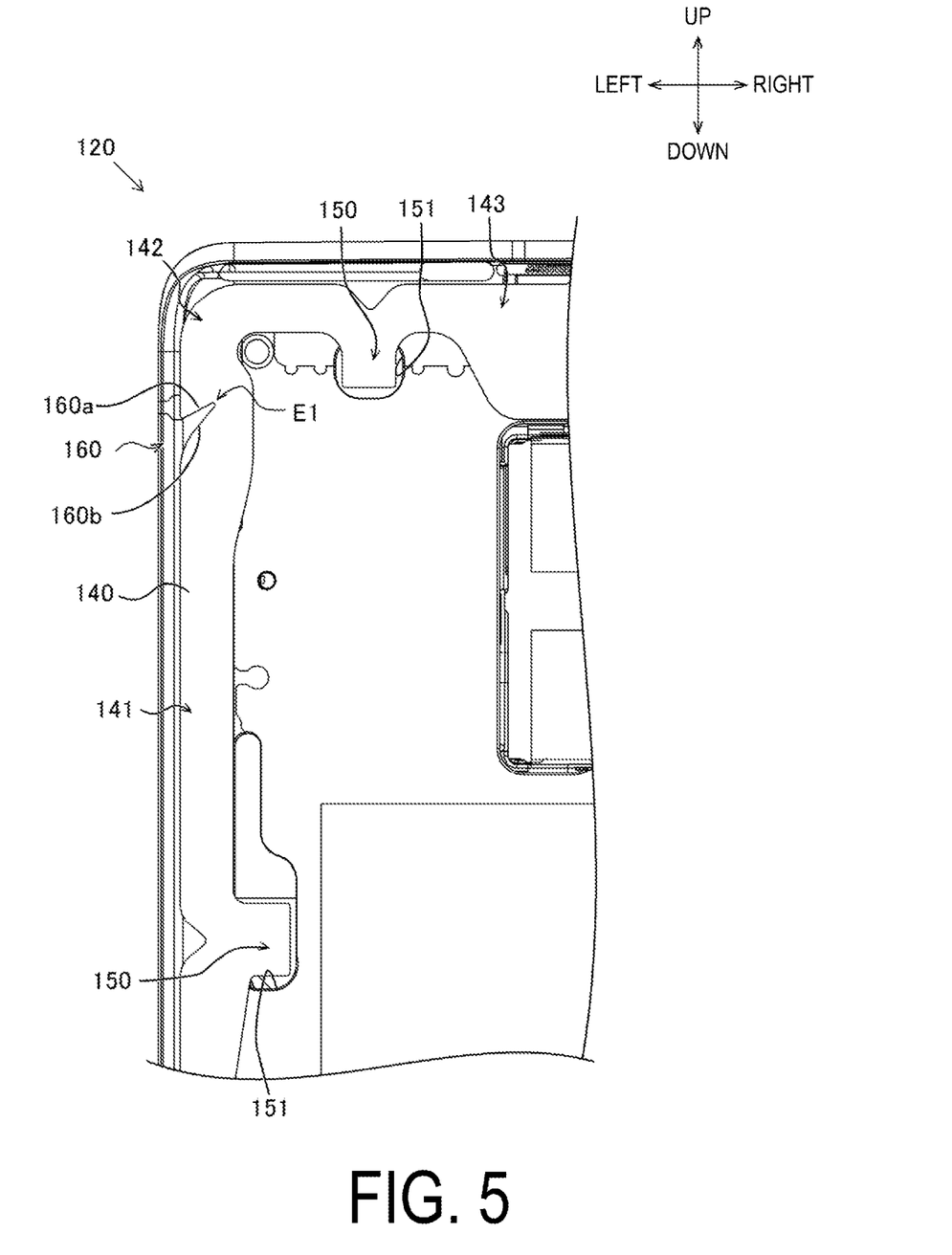
FIG. 5 is a partially enlarged view of FIG. 4, illustrating a first extending portion.

With reference to FIGS. 3 to 5, an adhesive sheet 140 will be described. FIG. 3 is an exploded perspective view of the electronic device 100. In FIG. 3, a substrate and the rear cover 130 attached to the cabinet 120 are omitted. FIG. 4 is a front view of the cabinet 120 with the adhesive sheet 140 attached. FIG. 5 is a partially enlarged view of FIG. 4, illustrating a first extending portion 141.

As illustrated in FIG. 3, the adhesive sheet 140 is provided between the display unit 110 and the cabinet 120, for example. That is, the adhesive sheet 140 fixes the display unit 110 and the cabinet 120 to each other.

The adhesive sheet 140 is an elongated band-shaped double-sided tape, for example. The adhesive sheet 140 is configured in such a manner that an adhesive force is reduced by pulling the adhesive sheet 140.

As illustrated in FIG. 4, the adhesive sheet 140 has a shape along an edge portion constituting the profile of the display unit 110 on a surface of the side facing the cabinet 120 of the display unit 110. The adhesive sheet 140 is formed in a substantially inverted U shape connecting a pair of right and left sides and an upper side of the display unit 110, for example. As described above, the adhesive sheet 140 extends along the three sides constituting the profile of the display unit 110, but this is not a imitation, and the adhesive sheet 140 only needs to extend along at least adjacent two sides constituting the profile of the display unit 110. Further, the adhesive sheet 140 is provided along the edge portion constituting the profile of the display unit 110, but this is not a limitation, and the adhesive sheet 140 may be provided along an edge portion constituting a profile of the cabinet 120, for example.

In the present embodiment, the adhesive sheet 140 includes the first extending portion 141 extending along the left side of the display unit 110, a first curved portion 142 curving from the left side to the upper side of the display unit 110, a second extending portion 143 extending along the upper side of the display unit 110, a second curved portion 144 curving from the upper side to the rig side of the display unit 110, and a third extending portion 145 extending along the right side of the display unit 110.

The adhesive sheet 140 has a plurality of tabs 150 with which the adhesive sheet 140 is pulled, for example. The tabs 150 each are a grip that does not have tackiness. The tabs 150 each are formed in a substantially rectangular shape in a front view, for example. In the present embodiment example, the tabs 150 are provided in the extending portions, more specifically, the first extending portion 141, the second extending portion 143, and the third extending portion 145, respectively.

Note that, although the tabs 150 are preferably provided in the extending portions on a one-to-one basis, this is not a limitation, and a plurality of the tabs 150 may be provided in each extending portion, and the tabs 150 may be provided in only a predetermined extending portion among the plurality of extending portions.

The tabs 150 are provided an inner peripheral side of the adhesive sheet 140, for example. The inner peripheral side of the adhesive sheet 140 means one side in a width direction of the adhesive sheet 140. The width direction of the adhesive sheet 140 means a direction perpendicular to the direction in which the adhesive sheet 140 extends. In the present embodiment, the width direction of the first extending portion 141 and the third extending portion 145 refers to the left-right direction, and the width direction of the second extending portion 143 refers to the vertical direction. Specifically, in the first extending portion 141, the tab 150 is provided in an inner peripheral edge located on the right side. In the second extending portion 143, the tab 150 is provided in the inner peripheral edge located on the lower side. In the third extending portion 145, the tab 150 is provided in the inner peripheral edge located on the left side.

The cabinet 120 has an opening 151 for pulling the tab 150 from the rear surface side of the cabinet 120 at a position overlapping with the tab 150 in the front-rear direction. The opening 151 is provided through the cabinet 120 in the front-rear direction. The opening 151 is formed so as to surround at least the tab 150 when viewed in the front-rear direction, for example. When a plurality of the tabs 150 are present, the opening 151 provided at a position corresponding to each of the tabs 150. This allows the tab 150 to be pulled through the opening 151 from the rear surface side of the cabinet 120 in a state where the rear cover 130 is removed from the electronic device 100. As a result, it is possible to peel off the adhesive sheet 140 provided between the display unit 110 and the cabinet 120 by pulling the tab 150 through the opening 151.

The adhesive sheet 140 includes, for example, a plurality of notched portions 160 for cutting the adhesive sheet 140 at predetermined positions. The notched portions 160 are provided so that the adhesive sheet 140 can be cut into portions corresponding to the extending portions. In the present embodiment, the notched portions 160 are provided on the first curved portion 142 side of the first extending portion 141 and the second curved portion 144 side of the second extending portion 143, respectively.

The notched portions 160 are provided on the outer peripheral side of the adhesive sheet 140, for example. The outer peripheral side means the other side in the width direction of the adhesive sheet 140. That is, the notched portion 160 is on the side opposite to the side where the tab 150 is provided, in the width direction of the adhesive sheet 140. Specifically, in the first extending portion 141, the notched portion 160 is provided in the outer peripheral edge located on the left side. In the second extending portion 143, the notched portion 160 is provided in the outer peripheral edge located on the upper side.

Note that the notched portion 160 is provided on the outer peripheral side of the adhesive sheet 140, but this is not a limitation, and the notched portion 160 only needs to be provided on the side opposite to the side where the tab 150 is provided in the width direction of the adhesive sheet 140, and for example, the notched portion 160 may be provided on the inner peripheral side of the adhesive sheet 140 while the tab 150 may be provided on the outer peripheral side of the adhesive sheet 140.

As illustrated in FIGS. 4 and 5, the notched portions 160 each have a shape cut out inward from the outer peripheral edge of the adhesive sheet 140. The notched portions 160 each have, for example, a shape cut out into a protruding shape that tapers inward from the outer peripheral edge of the adhesive sheet 140. In addition, the notched portions 160 each have a shape that is cut out so as to be inclined toward the curved portion side located in the vicinity thereof inward from the outer peripheral edge of the adhesive sheet 140, for example.

As illustrated in FIG. 5, in the first extending portion 141, the notched portion 160 has a pair of sides extending inward from the outer peripheral edge of the adhesive sheet 140. The pair of sides are an upper side 160a located on the first curved portion 142 side and a lower side 160b located on a side opposite to the first curved portion 142 side. The upper side 160a is inclined toward the first curved portion 142 side (upper side) inward from the outer peripheral edge of the first extending portion 141. Similarly, the lower side 160b is inclined toward the first curved portion 142 side (upper side) inward from the outer peripheral edge of the first extending portion 141.

Similarly, in the second extending portion 143, the notched portion 160 has a pair of sides extending inward from the outer peripheral edge of the adhesive sheet 140. The pair of sides is a right side 160c located on the second curved portion 144 side and a left side 160d located on a side opposite to the second curved portion 144 side (see FIG. 8). The right side 160c is inclined toward the second curved portion 144 side (right side) downward from the outer peripheral edge of the second extending portion 143. Similarly, the left side 160d is inclined toward the second curved portion 144 side (right side) downward from the outer peripheral edge of the second extending portion 143.

Figure 6:
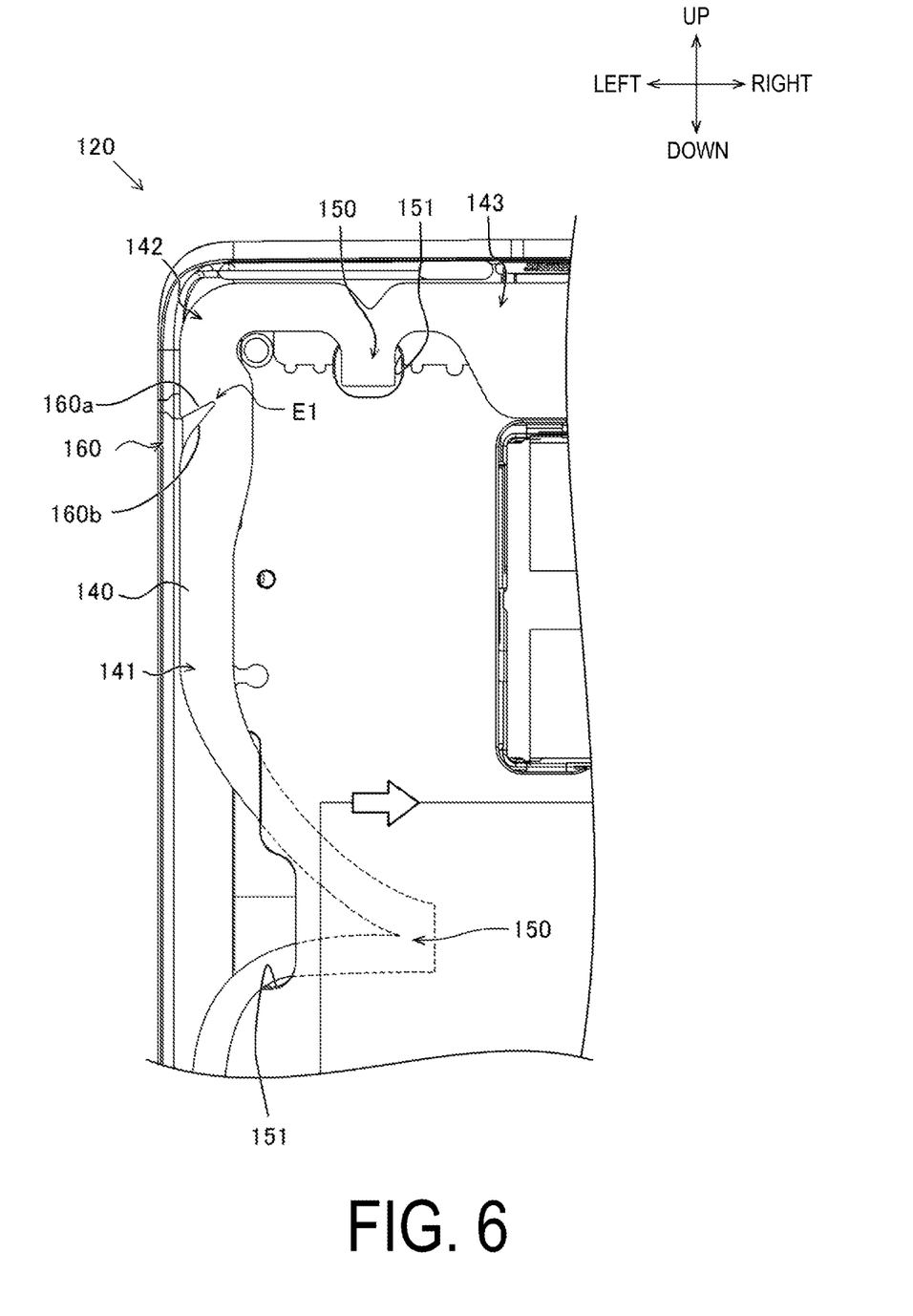
FIG. 6 is a front view of the cabinet, illustrating the adhesive sheet in a state where the adhesive sheet is pulled using a tab of the first extending portion.
Figure 7:
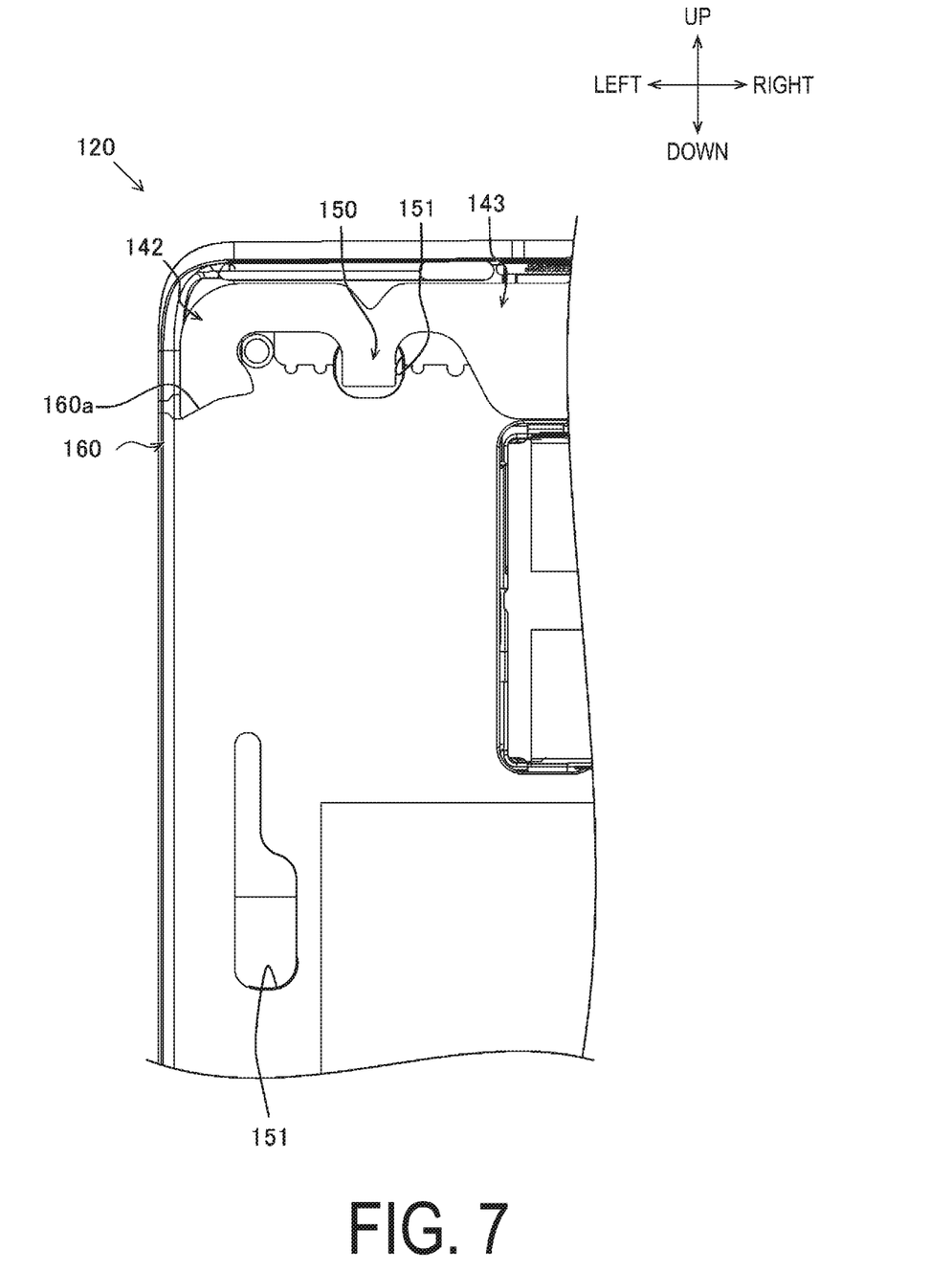
FIG. 7 is a front view of the cabinet illustrating the adhesive sheet in a state where the first extending portion is peeled off.

Hereinafter, with reference to FIGS. 6 and 7, peel-off of the adhesive sheet 140 using the tab 150 of the first extending portion 141 will be described. FIG. 6 is a front view of the cabinet 120, illustrating the adhesive sheet 140 in a state where the adhesive sheet 140 is pulled using the tab 150 of the first extending portion 141. FIG. 7 is a front view of the cabinet 120, illustrating the adhesive sheet 140 in a state where the first extending portion 141 is peeled off.

As illustrated in FIG. 6, a user can gradually peel off the adhesive sheet 140 vertically from a portion of the first extending portion 141 located near the tab 150 by pulling the tab 150 of the first extending portion 141 from the rear surface side of the cabinet 120 in a direction of an arrow (rightward) illustrated in FIG. 6 via the opening 151. Then, the tab 150 or the peeled adhesive sheet 140 near the tab 150 is gripped and pulled upward, for example, so that one end side (lower end side) of the adhesive sheet 140 can be peeled off. On the other hand, when the tab 150 or the peeled adhesive sheet 140 near the tab 150 is gripped and pulled downward, for example, and the adhesive sheet 140 is peeled off up to a portion at or near the notched portion 160, stress is concentrated in a narrowed portion of the first extending portion 141 having the notched portion 160, so that the adhesive sheet 140 can be cut at the notched portion 160. Thus, as illustrated in FIG. 7, it is possible to peel off only a portion of the adhesive sheet 140 corresponding to the first extending portion 141 by pulling the tab 150 of the first extending portion 141.

In this way, the adhesive sheet 140 can be peeled off for portions of the adhesive sheet 140 corresponding to sides of the display unit 110, so that the adhesive sheet 140 can be prevented from becoming entangled in the curved portion connecting the extending portions corresponding to the sides. As a result, the adhesive sheet 140 does not remain in the curved portion, and thus it is possible to detach the display unit 110 easily from the cabinet 120 without damaging the display unit 110. On the other hand, the notched portion 160 is provided on the side opposite to the side on which the tab 150 is provided in the width direction of the adhesive sheet 140, whereby a narrowed portion of the adhesive sheet 140 is provided on the side of the first extending portion 141 on which stress is likely to act, that is, on the side on which the tab 150 is provided, and thus stress can be concentrated in this portion, so that the adhesive sheet 140 can be reliably cut.

In addition, the notched portion 160 has a shape cut out into a protruding shape that tapers inward from the outer peripheral edge, and thus it is possible to form a (inner end E1) of the notched portion 160 into a shape in which stress is likely to be concentrated when the adhesive sheet 140 is pulled. Thus, stress can be concentrated in a narrowed portion of the adhesive sheet 140 where the notched portion 160 is formed and the adhesive sheet 140 can be cut.

Further, the notched portion 160 has a shape cut out in such a manner that the notched portion 160 is inclined toward the first curved portion 142 side located in the vicinity thereof inward from the outer peripheral edge, so that the width of the adhesive sheet 140 on the first curved portion 142 side with respect to the inner end E1 of the notched portion 160 can be significantly greater than the width of the adhesive sheet 140 located at the inner end E1 of the notched portion 160. This allows stress to be concentrated in a narrowed portion of the adhesive sheet 140 located at the inner end E1 of the notched portion 160 and the adhesive sheet 140 can be cut.

More specifically, the lower side 160b is inclined toward the first curved portion 142 side to form an obtuse angle between the outer peripheral edge and the lower side 160b of the notched portion 160, so that a length of the adhesive sheet 140 in the width direction can be gradually shortened from the outer peripheral edge to the lower side 160b of the notched portion 160. As a result, when the adhesive sheet 140 pulled, the adhesive sheet 140 can be smoothly peeled off toward the inner end E1 of the notched portion 160, so that it is possible to concentrate stress in the inner end E1 of the notched portion 160, that is, the narrowed portion of the adhesive sheet 140, and reliably cut the adhesive sheet 140.

In addition, the upper side 160a is inclined toward the first curved portion 142 side to form an acute angle between the inner end E1 of the notched portion 160 and the upper side 160a of the notched portion 160, so that the width of the adhesive sheet 140 can be sharply increased on the first curved portion 142 side (upper side) with respect the inner end E1 of the notched portion 160. Thus, when the adhesive sheet 140 is pulled, stress can be concentrated at the inner end E1 of the notched portion 160, that is, the narrowed portion of the adhesive sheet 140, and the adhesive sheet 140 can be cut reliably.

Figure 8:
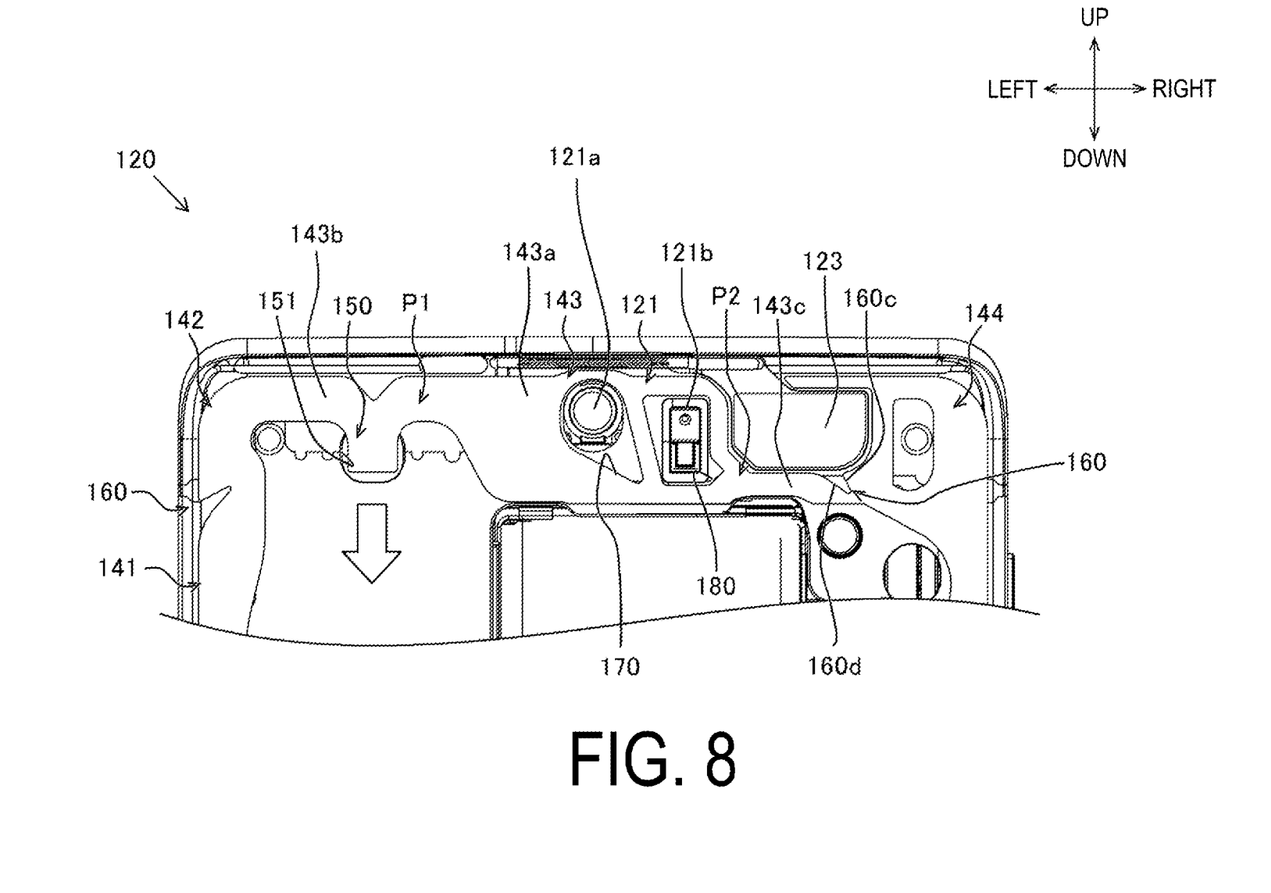
FIG. 8 is a partially enlarged view of FIG. 4, illustrating a second extending portion.

Note that the notched portion 160 provided in the second extending portion 143 has the same configuration as the notched portion 160 provided in the first extending portion 141, and thus has the effect described above.

Figure 9:
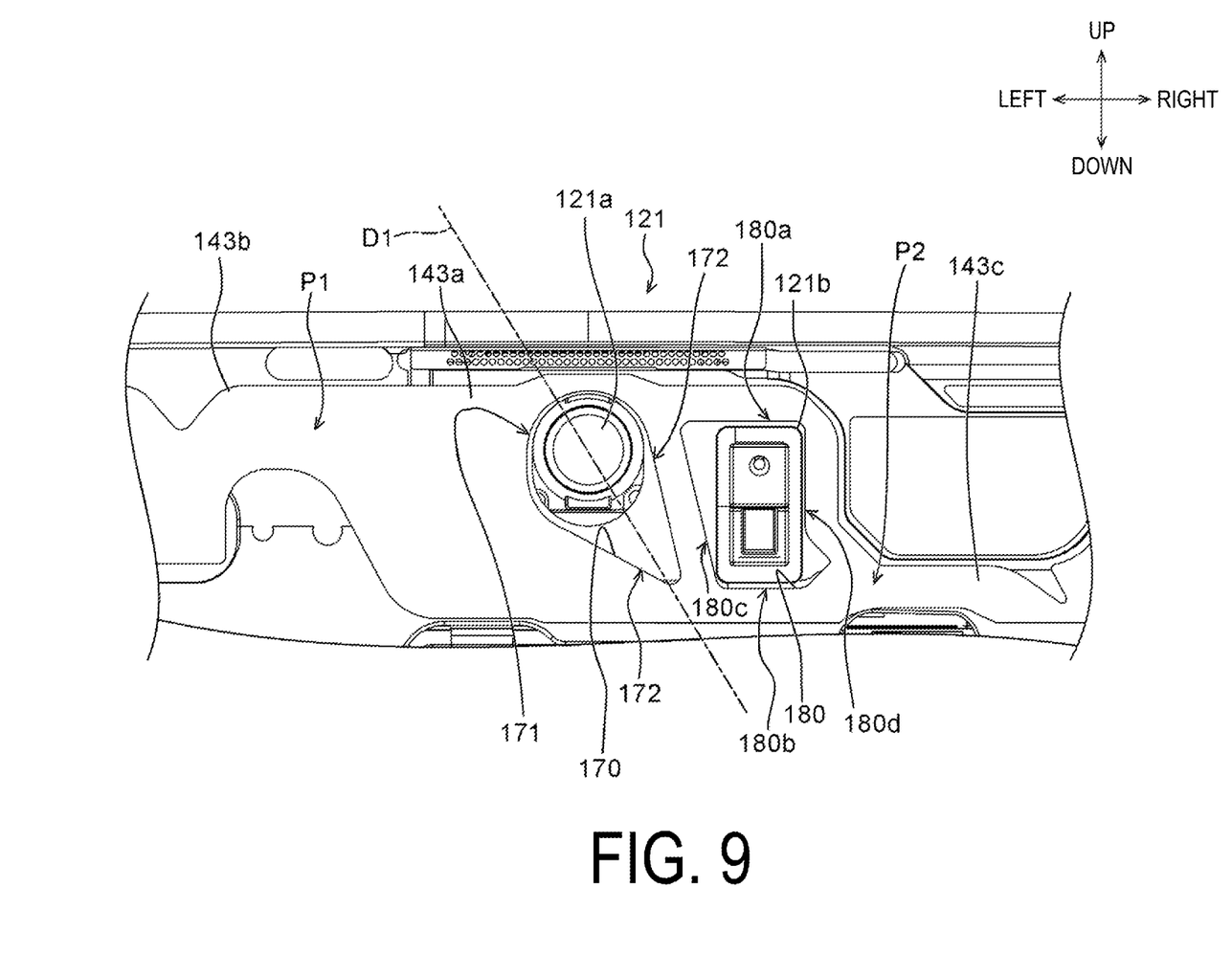
FIG. 9 is a partially enlarged view of FIG. 4, illustrating a widened portion.

Hereinafter, with reference to FIGS. 8 and 9, the second extending portion 143 will be described. FIG. 8 is partially enlarged view of FIG. 4, illustrating the second extending portion 143. FIG. 9 is a partially enlarged view of FIG. 4, illustrating a widened portion 143a.

The second extending portion 143 extends in the left-right direction. The second extending portion 143 includes the widened portion 143a surrounding the camera 121a and a left narrowed portion 143b provided adjacently to the left side of the widened portion 143a, and a right narrowed portion 143c provided adjacently to the right side of the widened portion 143a.

As illustrated in FIG. 8, the widened portion 143a is disposed at the center of the upper end portion of the cabinet 120. The widened portion 143a provided at a position corresponding to the first camera module 121.

The left narrowed portion 143b is provided so as to have a relatively small width (length in the vertical direction) relative to the widened portion 143a. The left narrowed portion 143b extends in the left-right direction so as to connect the first curved portion 142 and the widened portion 143a. More specifically, the left narrowed portion 143b extends in the left-right direction so as to pass through the upper side between the first curved portion 142 and the widened portion 143a. That connecting portion P1 between the left narrowed portion 143b and the widened portion 143a is located closer to the upper side in the width direction of the widened portion 143a. In other words, the adhesive sheet 140 is formed to bulge downward from the left narrowed portion 143b to the widened portion 143a.

The left narrowed portion 143b is provided with the tab 150 for pulling the second extending portion 143. The tab 150 is provided at the inner peripheral edge of the left narrowed portion 143b.

The right narrowed port on 143c is provided so as to have a relatively small width (length in the vertical direction) relative to the widened portion 143a. The right narrowed portion 143c extends in the left-right direction so as to connect the widened portion 143a and the second curved portion 144. More specifically, the right narrowed portion 143c extends in the left-right direction so as to pass through the lower side of the receiver 123 to avoid the receiver 123 disposed on the upper side between the widened portion 143a and the second curved portion 144. In other words, a connecting portion P2 between the right narrowed portion 143c and the widened portion 143a is located closer to the lower side in the width direction of the widened portion 143a. In other words, the adhesive sheet 140 is formed so as to bulge upward from the right narrowed portion 143c to the widened portion 143a. Note that the right narrowed portion 143c is disposed in a small space between the receiver 123 and the second camera module 122, and thus has a relatively small width as compared to the left narrowed portion 143b.

The right narrowed port on 143c is provided with the notched portion 160 at an outer peripheral edge located on the upper side. The notched portion 160 inclined toward the second curved portion 144 side inward from the outer peripheral edge.

In the configuration described above, a user can gradually peel off the adhesive sheet 140 in the right-left direction from a portion of the second extending portion 143 located near the tab 150 by pulling the tab 150 of the left narrowed portion 143b in a direction of an arrow (downward) illustrated in FIG. 8. Then, the tab 150 or the peeled adhesive sheet 140 near the tab 150 is gripped and pulled rightward, for example, so that one end side (left end side) of the adhesive sheet 140 can be peeled off up to a portion of the first extending portion 141 where the notched portion 160 is formed. On the other hand, when the tab 150 or the peeled adhesive sheet 140 near the tab 150 is gripped and pulled leftward, for example, and the adhesive sheet 140 is peeled off up to a portion of the right narrowed portion 143c at or near the notched portion 160 through the widened portion 143a, stress is concentrated in a narrowed portion of the right narrowed portion 143c having the notched portion 160, so that the adhesive sheet 140 can be cut in the notched portion 160. Thus, it is possible to peel off a portion of the adhesive sheet 140 corresponding to the second extending portion 143, more specifically, the first curved portion 142 and the second extending portion 143 by pulling the tab 150 of the second extending portion 143.

Finally, it is possible to peel off a portion of the adhesive sheet 140 corresponding to the third extending portion 145, more specifically, the second curved portion 144 and the third extending portion 145, by pulling the tab 150 of the third extending portion 145 of the adhesive sheet 140. As described above, it possible to cut the adhesive sheet 140 into portions corresponding to extending portions by pulling the adhesive sheet 140 by using the tab 150 corresponding to each extending portion.

As illustrated in FIG. 9, the widened portion 143*a* has a first opening 170 exposing the camera 121*a* to the display unit 110 side, and a second opening 180 exposing the proximity sensor 121*b* to the display unit 110 side.

A longitudinal direction D1 of the first opening 170 is inclined with respect to the left-right direction so as to approach the connecting portion P1 between the widened portion 143*a* and the left narrowed portion 143*b* toward the left narrowed portion 143*b*, leftward in the present embodiment. That is, the longitudinal direction D1 is inclined with respect to the left-right direction in such a manner that an end portion of the first opening 170 on the left narrowed portion 143*b* side approaches the connecting portion P1.

As described above, an adhesive area of the adhesive sheet 140 is reduced in the connecting portion P1 between the widened portion 143*a* and the left narrowed portion 143*b* to prevent the stress at the time of pulling the tab 150 to peel off the adhesive sheet 140 from being concentrated in the connecting portion P1 before being transmitted to the widened portion 143*a*, so that it is possible to prevent the adhesive sheet 140 from breaking off. In addition, when the longitudinal direction D1 of the first opening 170 and a direction in which the adhesive sheet 140 is pulled in the widened portion 143*a* (direction in which the width is increased from the left narrowed portion 143*b* to the widened portion 143*a*, diagonally right downward in the present embodiment) are made closer to the same direction, the first opening 170 is unlikely to become a resistance at the time of peeling off the adhesive sheet 140, so that it is possible to prevent the adhesive sheet 140 from breaking off.

Furthermore, the connecting portion P1 between the left narrowed portion 143*b* and the widened portion 143*a* and the connecting portion P2 between the right narrowed portion 143*c* and the widened portion 143*a* are provided so as to be separated from each other in the width direction of the adhesive sheet 140. That is, the connecting portion P1 is disposed closer to the upper side of the widened portion 143*a*, and the connecting portion P2 is disposed closer to the lower side of the widened portion 143*a*. As a result, the longitudinal direction D1 of the first opening 170 can be inclined so as to approach the connecting portion P2 between the widened portion 143*a* and the right narrowed portion 143*c* toward the right narrowed portion 143*c* side, rightward in the present embodiment. That is, the longitudinal direction D1 can be inclined with respect to the left-right direction in such a manner that an end of the first opening 170 on the right narrowed portion 143*c* side approaches the connecting portion P2.

This allows the first opening 170 to be provided in such a manner that the end portion of the first opening 170 on the left narrowed portion 143*b* side approaches the connecting portion P1, and the end portion of the first opening 170 on the right narrowed portion 143*c* side approaches the connecting portion P2. As a result, it is possible to reduce the adhesive area of the adhesive sheet 140 near the connecting portions, so that stress concentration in the connecting portions can be suppressed and the adhesive sheet 140 can be prevented from breaking off.

The first opening 170 is formed in such a manner that an opening area becomes smaller toward the right narrowed portion 143*c*. The first opening 170 has an arcuate portion 171 covering a part of the peripheral edge portion of the camera 121*a*, and a pair of sides 172 connected to end portions of the arcuate portion 171 and extending along the longitudinal direction D1 side of the first opening 170, for example. The pair of sides 172 are formed in such a manner that a spacing between the sides becomes narrower toward the right narrowed portion 143*c*.

Because the right narrowed portion 143*c* is located farther from the tab 150 than the left narrowed portion 143*b*, and has a smaller width than the left narrowed portion 143*b*, the right narrowed portion 143*c* is likely to break off when the adhesive sheet 140 is peeled off. Thus, the first opening 170 is formed in such a manner that the opening area becomes smaller toward the right narrowed portion 143*c* to suppress a sharp change in adhesive area of the adhesive sheet 140 on the right narrowed portion 143*c* side, so that the adhesive sheet 140 is prevented from breaking off.

The widened portion 143*a* has a second opening 180 far exposing the proximity sensor 121*b* on the display unit 110 side between the first opening 170 and the right narrowed portion 143*c*. The proximity sensor 121*b* is an electronic component having a circumference that does not need to be covered by the adhesive sheet 140. The circumference of the proximity sensor 121*b* is intentionally covered with the adhesive sheet 140 at position on the right narrowed portion 143*c* side of the widened portion 143*a*, whereby the adhesive area of the adhesive sheet 140 can be gradually reduced toward the right narrowed portion 143*c*. Thus, it is possible to suppress stress concentration in the connecting portion P2 between the right narrowed portion 143*c* and the widened portion 143*a*, and prevent the adhesive sheet 140 from breaking off.

The second opening 180 is formed in such a manner that the thickness of the adhesive sheet 140 located therearound is substantially constant. Specifically, the second opening 180 is formed in such a manner that a spacing from the outer peripheral edge of the widened portion 143*a*, a spacing from the inner peripheral edge of the widened portion 143*a*, a spacing from the end of the widened portion 143*a* on the right narrowed portion 143*c* side, and a spacing from the first opening 170 are substantially constant.

That is, the second opening 180 includes an upper side 180*a* disposed with a substantially constant spacing from the outer peripheral edge of the widened portion 143*a*, a lower side 180*b* disposed with a substantially constant spacing from the inner peripheral edge of the widened portion 143*a*, a left side 180*c* disposed with a substantially constant spacing from the first opening 170, and a right side 180*d* disposed with a substantially constant spacing from the right end of the widened portion 143*a*.

As described above, the thickness of the adhesive sheet 140 located around the second opening 180 is made substantially constant to reduce the adhesive area gradually toward the right narrowed portion 143*c* side and suppress breaking of the adhesive sheet 140. In addition, the second opening 180 is provided in such a manner that a spacing between the first opening 170 (side of the pair of sides 172 on the second opening 180 side) and the second opening 180 (left side 180*c*) is constant, so that it is possible to suppress breakage of the adhesive sheet 140.

Note that the longitudinal direction D1 of the first opening 170 is inclined with respect to the left-right direction so as to approach the connecting portion P1 between the widened portion 143*a* and the left narrowed portion 143*b* toward the left narrowed portion 143b in which the tab 150 is provided, but this is not a limitation, and, for example, in a case where the tab 150 is provided in the right narrowed portion 143c, the longitudinal direction D1 of the first opening 170 may be inclined with respect to the left-right direction so as to approach the connecting portion P2 between the widened portion 143a and the right narrowed portion 143c toward the right narrowed portion 143c.

Furthermore, the notched portions 160 are provided on the first curved portion 142 side of the first extending portion 141 and the second curved portion 144 side of the second extending portion 143, but this is not a limitation, and the notched portions 160 may be provided on the first curved portion 142 side of the second extending portion 143 and the second curved portion 144 side of the third extending portion 145, or on the first curved portion 142 side of the first extending portion 141 and the second curved portion 144 side of the third extending portion 145, or the notched portion 160 may be provided on only one extending portion of the plurality of extending portions.

Figure 10:
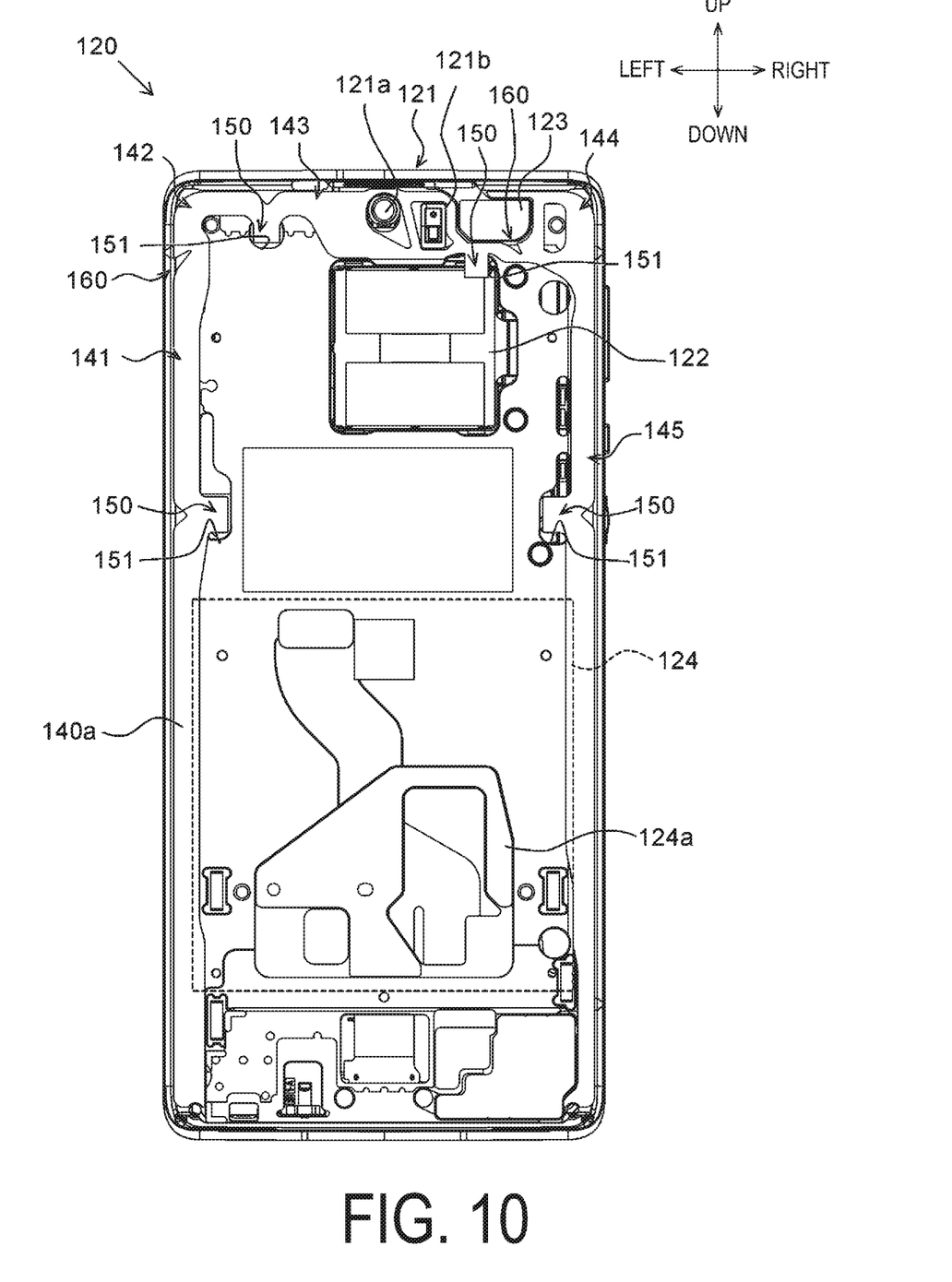
FIG. 10 is a front view of a cabinet, illustrating a first modified example of the adhesive sheet.

With reference to FIG. 10, a first modified example of the adhesive sheet will be described. FIG. 10 is a front view of the cabinet 120, illustrating the first modified example of the adhesive sheet. An adhesive sheet 140a of the first modified example differs from the adhesive sheet 140 in that the tab 150 is provided in the right narrowed portion 143c. Description of the configuration of the adhesive sheet 140a similar to that of the adhesive sheet 140 will be omitted.

The adhesive sheet 140a is provided with the tab 150 in the right narrowed portion 143c. The tab 150 is provided closer to the widened portion 143a than the notched portion 160, in the right narrowed portion 143c.

In the configuration described above, a user can gradually peel off the adhesive sheet 140a in the right-left direction from a portion of the second extending portion 143 located near the tab 150 by pulling the tab 150 of the right narrowed portion 143c downward. Then, the tab 150 or the peeled adhesive sheet 140a near the tab 150 is gripped and pulled rightward, for example, so that the adhesive sheet 140a can be peeled off up to a portion of the first extending portion 141 where the notched portion 160 is formed via the widened portion 143a and the left narrowed portion 143b. On the other hand, when the tab 150 or the peeled adhesive sheet 140a near the tab 150 is gripped and pulled leftward, for example, and the adhesive sheet 140a is peeled off up to a portion of the right narrowed portion 143c at or near the notched portion 160, stress is concentrated in a narrowed portion of the right narrowed portion 143c having the notched portion 160, so that the adhesive sheet 140a can be cut at the notched portion 160. Thus, it is possible to peel off a portion of the adhesive sheet 140a corresponding to the second extending portion 143, more specifically, the first curved portion 142 and the second extending portion 143, by pulling the tab 150 of the second extending portion 143.

Further, the longitudinal direction D1 of the first opening 170 is inclined with respect to the left-right direction so as to approach the connecting portion P2 between the widened portion 143a and the right narrowed portion 143c toward the right narrowed portion 143c side where the tab 150 is provided, rightward in the present embodiment. That is, the longitudinal direction D1 is inclined with respect to the left-right direction in such a manner that at the end of the first opening 170 on the right narrowed portion 143c side approaches the connecting portion P2.

In addition, the longitudinal direction D1 of the first opening 170 is inclined with respect to the left-right direction so as to approach the connecting portion P1 between the widened portion 143a and the left narrowed portion 143b toward the left narrowed portion 143b, leftward in the present embodiment. That is, the longitudinal direction D1 is inclined with respect to the left-right direction in such a manner that the end portion of the first opening 170 on the left narrowed portion 143b side approaches the connecting portion P1.

This allows the first opening 170 to be provided in such a manner that the end portion of the first opening 170 on the left narrowed portion 143b side approaches the connecting portion P1, and the end portion of the first opening 170 on the right narrowed portion 143c side approaches the connecting portion P2. As a result, it is possible to reduce the adhesive area of the adhesive sheet 140a near the connecting portions, so that stress concentration in the connecting portions can be suppressed and the adhesive sheet 140a can be prevented from breaking off.

Note that, in the adhesive sheet 140a, the tab 150 is provided in each of the left narrowed portion 143b and the right narrowed portion 143c, but this is not a limitation and the tab 150 may be provided only in the right narrowed portion 143c.

Note that the adhesive sheet 140 and the adhesive sheet 140a are provided between the display unit 110 and the cabinet 120, but this is not a limitation, and the adhesive sheet 140 and the adhesive sheet 140a only need to be provided between an electronic component and the cabinet 120 and may be provided between the rechargeable battery 124 and the cabinet 120, for example.

In the configuration described above, the electronic device 100 includes an electronic component (in the embodiment described above, the display unit 110), the cabinet 120, the adhesive sheet 140, and the tab 150. The cabinet 120 is provided so as to face the electronic component. The adhesive sheet 140 includes two extending portions (the first extending portion 141 and the second extending portion 143 in the embodiment described above) and a curved portion (the first curved portion 142 in the embodiment described above), and is provided between the electronic component and the cabinet 120. The two extending portions extend along two adjacent sides of the electronic component, respectively. The curved portion connects the two extending portions. The tab 150 is provided in one of the two extending portions (the first extending portion 141 in the embodiment described above), and is a tab for pulling the adhesive sheet 140. The adhesive sheet 140 has the notched portion 160 provided on a side of one of the extending portions closer to a curved portion (the first curved portion 142 in the embodiment described above) and one side of the adhesive sheet 140 in the width direction. This allows the adhesive sheet 140 to be peeled off for each of the portions, of the adhesive sheet 140, corresponding to sides of the electronic component, so that it is possible to prevent the adhesive sheet 140 from becoming entangled in the curved portion connecting the extending portions corresponding to the sides. As a result, the adhesive sheet 140 does not remain in the curved portion, and thus it is possible to detach the electronic component easily from the cabinet 120 without damaging the electronic component.

Furthermore, the notched portion 160 is provided on the side opposite to the side where the tab 150 is provided in the width direction of the adhesive sheet 140. Here, when the tab 150 is pulled, stress is likely to act on the same side of the one of the extending portions as the tab 150. Accordingly, by providing the notched portion 160 as described above, the narrowed portion of the adhesive sheet 140 is provided on the side of the one of the extending portions on which stress is likely to act, so that stress can be concentrated in this portion and the adhesive sheet 140 can be cut reliably.

In addition, the notched portion 160 has a shape cut out into a protruding shape that is tapered from one side (outer peripheral side in the embodiment described above) to the other side (inner side in the embodiment described above) of the adhesive sheet 140 in the width direction. As a result, the tip (inner end E1) of the notched portion 160 can be made into a shape in which stress is likely to be concentrated the adhesive sheet 140 is pulled. Thus, stress can be concentrated in a narrowed portion of the adhesive sheet 140 where the notched portion 160 is formed and the adhesive sheet 140 can be cut.

In addition, the notched port 160 has a shape cut out so as to be inclined toward the curved portion (first curved portion 142 in the embodiment described above) side from one side (outer peripheral side in the embodiment described above) to the other side (inner side in the embodiment described above) of the adhesive sheet 140 in the width direction. This allows the thickness of the adhesive sheet 140 on the curved portion (first curved portion 142) side with respect to the inner end E1 of the notched portion 160 to be made sharply greater than the width of the adhesive sheet 140 located at the inner end E1 the notched portion 160. This allows stress to be concentrated in the narrowed portion of the adhesive sheet 140 located at the inner end E1 of the notched portion 160 and the adhesive sheet 140 can be cut.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An electronic device comprising:
an electronic component;
a cabinet provided facing the electronic component;
an adhesive sheet comprising two extending portions extending along two adjacent sides of the electronic component and a curved portion connecting the two extending portions, being provided between the electronic component and the cabinet, and being adhered to the electronic component and the cabinet; and
a tab provided in one of the two extending portions and configured to enable the adhesive sheet to be pulled,
wherein the one of the two extending portions extends in a first direction along a corresponding side of the two adjacent sides,
the adhesive sheet has a notched portion that is provided on one side in a second direction orthogonal to the first direction of the one of the two extending portions, and that is closer to the curved portion than is the tab in the first direction, and
the tab is provided in another side opposite to the one side in the second direction of the one of the two extending portions.

2. The electronic device according to claim 1, wherein the notched portion has a protruding shape that is tapered from the one side to the other side in the second direction.

3. The electronic device according to claim 1, wherein the notched portion has a shape inclined towards the curved portion from the one side to the other side in the second direction.

\* \* \* \* \*